US012786571B2

(12) United States Patent
Zeng

(10) Patent No.: US 12,786,571 B2
(45) Date of Patent: Nov. 3, 2026

(54) METHOD AND DOORBELL DEVICE FOR CAPTURING IMAGES BY A CAMERA OF THE DOORBELL DEVICE

(71) Applicant: TP-Link Systems Inc., Irvine, CA (US)

(72) Inventor: Yan Zeng, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 72 days.

(21) Appl. No.: 18/967,620

(22) Filed: Dec. 3, 2024

(65) Prior Publication Data

US 2026/0156365 A1 Jun. 4, 2026

(51) Int. Cl.

| | |
|---|---|
| ***H04N 23/71*** | (2023.01) |
| ***G06V 10/50*** | (2022.01) |
| ***G06V 10/764*** | (2022.01) |
| ***G06V 10/774*** | (2022.01) |
| ***G06V 10/776*** | (2022.01) |
| ***G06V 10/98*** | (2022.01) |
| ***G06V 20/52*** | (2022.01) |
| ***H04N 7/18*** | (2006.01) |
| ***H04N 23/61*** | (2023.01) |

(52) U.S. Cl.

CPC ............. *H04N 23/71* (2023.01); *G06V 10/50* (2022.01); *G06V 10/764* (2022.01); *G06V 10/774* (2022.01); *G06V 10/776* (2022.01); *G06V 10/993* (2022.01); *G06V 20/52* (2022.01); *H04N 7/186* (2013.01); *H04N 23/61* (2023.01)

(58) Field of Classification Search

CPC ........ H04N 23/71; H04N 23/61; H04N 7/186; G06V 20/52; G06V 10/50; G06V 10/993; G06V 10/774; G06V 10/776; G06V 10/764

See application file for complete search history.

(56) References Cited

U.S. PATENT DOCUMENTS

| | | | | |
|---|---|---|---|---|
| 2015/0326791 | A1* | 11/2015 | Stahl ...................... | H04N 23/69 348/240.99 |
| 2018/0332204 | A1* | 11/2018 | Chien .................... | H04N 7/186 |
| 2019/0267037 | A1* | 8/2019 | Jiang ...................... | G11B 27/36 |
| 2021/0103201 | A1* | 4/2021 | Galor Gluskin ....... | H04N 23/71 |

FOREIGN PATENT DOCUMENTS

| | | | |
|---|---|---|---|
| CN | 103888652 | A | 6/2014 |
| CN | 104657575 | A | 5/2015 |
| CN | 109145840 | A | 1/2019 |
| CN | 118175430 | A | 6/2024 |

* cited by examiner

*Primary Examiner* — Jae N Noh

(74) *Attorney, Agent, or Firm* — Loeb & Loeb LLP

(57) ABSTRACT

This disclosure provides a method and a doorbell device for capturing images by a camera of the doorbell device. The method includes: capturing a first image by the camera with a first set of image capturing parameter values; identifying an environmental optical source class based on a doorbell environment to be monitored by the camera of the doorbell device and an optical source condition illuminating the doorbell environment according to the first image; selecting a second set of image capturing parameter values according to the identified environmental optical source class; and capturing a second image by the camera with the second set of image capturing parameter values.

17 Claims, 7 Drawing Sheets

METHOD AND DOORBELL DEVICE FOR CAPTURING IMAGES BY A CAMERA OF THE DOORBELL DEVICE

TECHNICAL FIELD

The present disclosure relates to doorbell field, and more specifically, to a method and a doorbell device for capturing images by a camera of the doorbell device.

BACKGROUND

A smart doorbell device is an important part of a smart home system. Core components of the doorbell device mainly include a camera, a microphone, a speaker, and a controller connected to the IEEE 802.11 network or Internet. For example, when someone presses the doorbell device button or passes by the door or in other cases, the sensor of the doorbell device can trigger a signal to start the camera and microphone. The camera starts to record the video and transmits the real-time image to the user equipment. The microphone collects the sound of the doorbell device and the voice of the visitor and transmits it to the user equipment through the IEEE 802.11 network or Internet. Users can make two-way calls with the doorbell device through the application on the smart phone or tablet computer, and check the situation outside the door.

In addition, the doorbell device also supports advanced functions such as face recognition and motion detection and so on. When someone is near the door, the camera can capture the image of the person outside the door and compare it with the pre-stored face database. If the match is successful, the doorbell device may send a notice of successful recognition to the user. If a stranger appears outside the door, the user may receive a stranger alert. At the same time, when the system detects people or objects moving outside the door, it may immediately trigger an alarm and send relevant sample images and videos to users.

In the usage applications of the doorbell device, the quality or effect of the images captured by the camera is important for many usages of the doorbell device.

SUMMARY

The present disclosure provides techniques for capturing images by a camera of a doorbell device to provide a better image and/or video effect for a specific user's doorbell device, so as to perform better functions of the doorbell device.

According to an aspect of the present disclosure, there is provided a method for capturing images by a camera of a doorbell device, the method comprising: capturing a first image by the camera with a first set of image capturing parameter values; identifying an environmental optical source class based on a doorbell environment to be monitored by the camera of the doorbell device and an optical source condition illuminating the doorbell environment according to the first image; selecting a second set of image capturing parameter values according to the identified environmental optical source class; and capturing a second image by the camera with the second set of image capturing parameter values.

In some embodiments, the optical source condition includes one or both of a type of an optical source illuminating the doorbell environment and an optical source coverage condition indicating how an optical source's light covers the doorbell environment, wherein the identifying an environmental optical source class based on the doorbell environment to be monitored by the camera of the doorbell device and the optical source condition illuminating the doorbell environment according to the first image comprises: determining the doorbell environment to be monitored by the camera of the doorbell device according to the first image; determining the type of the optical source illuminating the doorbell environment according to the first image; and/or determining the optical source coverage condition indicating how the optical source's light covers the doorbell environment according to the first image; and identifying the environmental optical source class based on the determined doorbell environment, the determined type of an optical source and/or the determined optical source coverage condition.

In some embodiments, the selecting the set of image capturing parameter values according to the identified environmental optical source class comprises: selecting the second set of image capturing parameter values based on a correspondence relationship between the second set of image capturing parameter values and the identified environmental optical source class.

In some embodiments, the correspondence relationship is determined by: capturing a plurality of first test images by a test camera under a first environmental optical source class with a plurality of first candidate sets of image capturing parameter values; calculating a first quality score for each of the plurality of first test images; determining a target test image with a highest first quality score of the first quality scores; and determining the correspondence relationship between a first target set of image capturing parameter values for capturing the target test image and the first environmental optical source class, wherein the first target set of image capturing parameter values is the second set of image capturing parameter values, and the first environmental optical source class is the identified environmental optical source class.

In some embodiments, the calculating the first quality score for each of the plurality of first test images comprises: calculating a set of values of quality evaluation indicators for each of the plurality of first test images; determining a first set of weights for the first environmental optical source class with respect to the set of the values of the quality evaluation indicators; and calculating a weighted sum for the set of the values of the quality evaluation indicators as the first quality score.

In some embodiments, the first set of weights for the first environmental optical source class is different from a second set of weights for a second environmental optical source class, or the first set of weights for a first doorbell environment is different from a second set of weights for a second doorbell environment, or the first set of weights for a first function of the doorbell device is different from a second set of weights for a second function of the doorbell device.

In some embodiments, the determining the doorbell environment to be monitored by the camera of the doorbell device according to the first image includes determining the doorbell environment based on a doorbell environment classification model by inputting the first image or extracted features from the first image; the determining the type of the optical source illuminating the doorbell environment according to the first image includes determining the type of the optical source based on an optical source classification model by inputting the first image or extracted features from the first image; and/or the determining the optical source coverage condition indicating how the optical source's light covers the doorbell environment according to the first image includes determining the optical source coverage condition based on a brightness histogram of the first image.

In some embodiments, the determining the optical source coverage condition based on a brightness histogram of the first image comprises: converting the first image into a gray-scale image; calculating a brightness histogram of the gray-scale image; determining a proportion of pixels with a pixel value larger than a value threshold based on the brightness histogram; determining a highlight area including the pixels with a pixel value larger than the value threshold, if the proportion is larger than a percentage threshold; determining an area percentage of the highlight area to the gray-scale image and a position of the highlight area; and determining the optical source coverage condition based on the area percentage of the highlight area and/or the position of the highlight area.

In some embodiments, the doorbell environment classification model or the optical source classification model is trained by: obtaining sample images; dividing the sample images divided into a training set of sample images and a verification set of sample images; performing a classification algorithm on the training set of sample images or extracted features from the training set of sample images, to train the doorbell environment classification model or the optical source classification model; and verifying the trained doorbell environment classification model or the optical source classification model by inputting the verification set of sample images.

In some embodiments, the doorbell environment classification model is updatable by receiving a user indicated doorbell environment with respect to the first image, and the optical source classification model is updatable by receiving a user indicated optical source type label with respect to the first image.

In some embodiments, the identifying the environmental optical source class based on the doorbell environment to be monitored by the camera of the doorbell device and the optical source condition illuminating the doorbell environment according to the first image includes identifying the environmental optical source class based on an environmental optical source classification model by inputting the first image or extracted features from the first image.

In some embodiments, the environmental optical source classification model is trained by: obtaining sample images; dividing the sample images divided into a training set of sample images and a verification set of sample images; performing a classification algorithm on the training set of sample images or extracted features from the training set of sample images, to train the environmental optical source classification model; and verifying the trained the environmental optical source classification model by inputting the verification set of sample images.

In some embodiments, the environmental optical source classification model is updatable by receiving a user indicated environmental optical source class with respect to the first image.

In some embodiments, the method further comprises: in response to a predetermined period being reached, resetting the second set of image capturing parameter values as the first set of image capturing parameter values; and repeating steps of the capturing a first image, the identifying, the selecting, and the capturing a second image.

According to another aspect of the present disclosure, there is provided a doorbell device for capturing images by a camera of the doorbell device, comprising: one or more processors; and a memory coupled to at least one of the processors; wherein a set of computer program instructions stored in the memory, which, when executed by at least one of the processors, perform actions of: capturing a first image by the camera with a first set of image capturing parameter values; identifying an environmental optical source class based on a doorbell environment to be monitored by the camera of the doorbell device and an optical source condition illuminating the doorbell environment according to the first image; selecting a second set of image capturing parameter values according to the identified environmental optical source class; and capturing a second image by the camera with the second set of image capturing parameter values.

In some embodiments, the optical source condition includes one or both of a type of an optical source illuminating the doorbell environment and an optical source coverage condition indicating how an optical source's light covers the doorbell environment, wherein the identifying an environmental optical source class based on the doorbell environment to be monitored by the camera of the doorbell device and the optical source condition illuminating the doorbell environment according to the first image comprises: determining the doorbell environment to be monitored by the camera of the doorbell device according to the first image; determining the type of the optical source illuminating the doorbell environment according to the first image; and/or determining the optical source coverage condition indicating how the optical source's light covers the doorbell environment according to the first image; and identifying the environmental optical source class based on the determined doorbell environment, the determined type of an optical source and/or the determined optical source coverage condition.

In some embodiments, the correspondence relationship is determined by: capturing a plurality of first test images by a test camera under a first environmental optical source class with a plurality of first candidate sets of image capturing parameter values; calculating a first quality score for each of the plurality of first test images; determining a target test image with a highest first quality score of the first quality scores; and determining the correspondence relationship between a first target set of image capturing parameter values for capturing the target test image and the first environmental optical source class, wherein the first target set of image capturing parameter values is the second set of image capturing parameter values, and the first environmental optical source class is the identified environmental optical source class.

In some embodiments, the calculating the first quality score for each of the plurality of first test images comprises: calculating a set of values of quality evaluation indicators for each of the plurality of first test images; determining a first set of weights for the first environmental optical source class with respect to the set of the values of the quality evaluation indicators; and calculating a weighted sum for the set of the values of the quality evaluation indicators as the first quality score.

In some embodiments, the first set of weights for the first environmental optical source class is different from a second set of weights for a second environmental optical source class, or the first set of weights for a first doorbell environment is different from a second set of weights for a second doorbell environment, or the first set of weights for a first function of the doorbell device is different from a second set of weights for a second function of the doorbell device.

In some embodiments, the determining the doorbell environment to be monitored by the camera of the doorbell device according to the first image includes determining the doorbell environment based on a doorbell environment classification model by inputting the first image or extracted features from the first image; the determining the type of the optical source illuminating the doorbell environment according to the first image includes determining the type of the optical source based on an optical source classification model by inputting the first image or extracted features from the first image; and/or the determining the optical source coverage condition indicating how the optical source's light covers the doorbell environment according to the first image includes determining the optical source coverage condition based on a brightness histogram of the first image.

In some embodiments, the determining the optical source coverage condition based on a brightness histogram of the first image comprises: converting the first image into a gray-scale image; calculating a brightness histogram of the gray-scale image; determining a proportion of pixels with a pixel value larger than a value threshold based on the brightness histogram; determining a highlight area including the pixels with a pixel value larger than the value threshold, if the proportion is larger than a percentage threshold; determining an area percentage of the highlight area to the gray-scale image and a position of the highlight area; and determining the optical source coverage condition based on the area percentage of the highlight area and/or the position of the highlight area.

In some embodiments, the doorbell environment classification model or the optical source classification model is trained by: obtaining sample images; dividing the sample images divided into a training set of sample images and a verification set of sample images; performing a classification algorithm on the training set of sample images or extracted features from the training set of sample images, to train the doorbell environment classification model or the optical source classification model; and verifying the trained doorbell environment classification model or the optical source classification model by inputting the verification set of sample images.

In some embodiments, the doorbell environment classification model is updatable by receiving a user indicated doorbell environment with respect to the first image, and the optical source classification model is updatable by receiving a user indicated optical source type label with respect to the first image.

In some embodiments, the identifying the environmental optical source class based on the doorbell environment to be monitored by the camera of the doorbell device and the optical source condition illuminating the doorbell environment according to the first image includes identifying the environmental optical source class based on an environmental optical source classification model by inputting the first image or extracted features from the first image.

In some embodiments, the environmental optical source classification model is trained by: obtaining sample images; dividing the sample images divided into a training set of sample images and a verification set of sample images; performing a classification algorithm on the training set of sample images or extracted features from the training set of sample images, to train the environmental optical source classification model; and verifying the trained the environmental optical source classification model by inputting the verification set of sample images.

In some embodiments, the environmental optical source classification model is updatable by receiving a user indicated environmental optical source class with respect to the first image.

In some embodiments, the set of computer program instructions stored in the memory, which, when executed by at least one of the processors, further perform actions of: in response to a predetermined period being reached, resetting the second set of image capturing parameter values as the first set of image capturing parameter values; and repeating steps of the capturing a first image, the identifying, the selecting, and the capturing a second image.

According to yet another aspect of the present disclosure, there is provided a non-transitory computer-readable storage medium having computer instructions stored thereon, wherein the computer instructions, when executed by a processor, cause the processor to perform the method according to any one of embodiments.

According to yet another aspect of the present disclosure, there is provided a computer program product comprising computer instructions, wherein the computer instructions, when executed by a processor, cause the processor to perform the method according to any one of embodiments.

At least based on the above embodiments of the present disclosure, a set of image parameters for a specific environmental optical source class for a camera of a doorbell device to capture an image and/or video may be selectable, so that a good image and/or video effect may be provided for a specific user's doorbell device, so as to perform better functions of the doorbell device.

BRIEF DESCRIPTION OF DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that terms such as "first", "second" and "third" are only for descriptive purposes, whereas cannot be understood as indicating or implying relative importance. Likewise, words like "a", "an" or "the" do not represent a quantity limit, but represent an existence of at least one. Words like "include" or "comprise" mean that an element or an object in front of said word encompasses those ones listed following the said word and their equivalents, without excluding other elements or objects.

In addition, technical features involved in different embodiments of the present disclosure described below may be combined with each other as long as no conflicts occur therebetween.

At present, the camera of the doorbell device normally uses a set of fixed image parameters, such as white balance, exposure compensation, Light Sensibility Ordinance (ISO), sharpening and noise reduction and so on, to capture images. The quality of the images captured by the camera of the doorbell device also depends on the set of fixed image parameters for the camera. Some automatic exposure and automatic white balance processing may be performed after capturing the image according to image brightness and color of the captured image during the use of the doorbell device, which may improve the quality of the captured image effect in a certain range, but the quality optimization result depends on the set of fixed image parameters for capturing the image. At present, the doorbell devices on the market only use a set of fixed image parameters preset in the doorbell devices in advance to capture images. Because the monitoring various scenes of users'doorbell devices are very different (such as at corridors, in open courtyards, under eaves, etc.), this fixed and preset set of preset parameters often cannot take the various monitored scenes of users'doorbell devices into account.

According to at least one embodiment of the disclosure, a set of image parameters for a specific environmental optical source class for a camera of a doorbell device to capture an image and/or a video may be selectable, so that a good image and/or video effect may be provided for a specific user's doorbell device, so as to perform better functions of the doorbell device.

Figure 1:
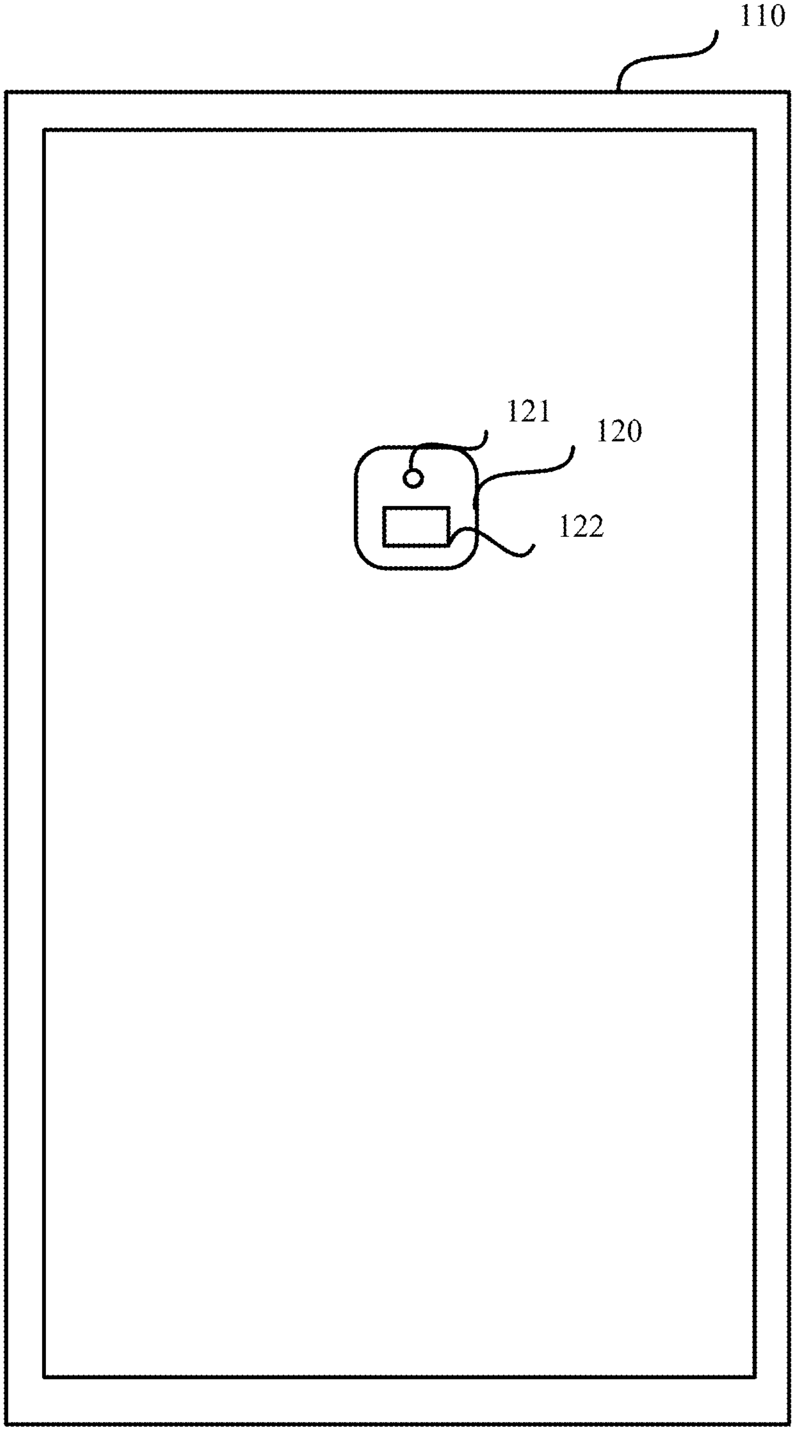
FIG. 1 shows an exemplary scene in which a doorbell device is used according to at least one embodiment of the present disclosure.

FIG. 1 shows an exemplary scene in which a doorbell device is used according to at least one embodiment of the present disclosure.

As FIG. 1 shows, a doorbell device 120 may be installed in the front of a door 110 of a house. The doorbell device 120 may be a smart doorbell device which can provide functions of real-time monitoring and video recording, motion detection and alarm, face recognition and visitor recognition, two-way voice call, remote control, recording and playback of surveillance video, smart home linkage, personalized setting and privacy protection and so on.

Normally, the doorbell device 120 may include a camera 121 for capturing an image or a video of a scene where the camera 121 of the doorbell 120 is facing. The scene may include corridor, porch, garden/greenery, square, street and so on. The quality or effect of many functions, such as functions of real-time monitoring and video recording, motion detection and alarm, and face recognition and visitor recognition, may be based on the quality or effect of the image or video captured by the camera 121.

Normally, the doorbell device 120 may further include a doorbell button 122 which may be installed in the front of the door or beyond the door. A visitor may press the doorbell button 122 to notify a house owner of a visitor coming. In order to perform various smart functions of the doorbell device, there may be more modules in the doorbell device.

Figure 2:
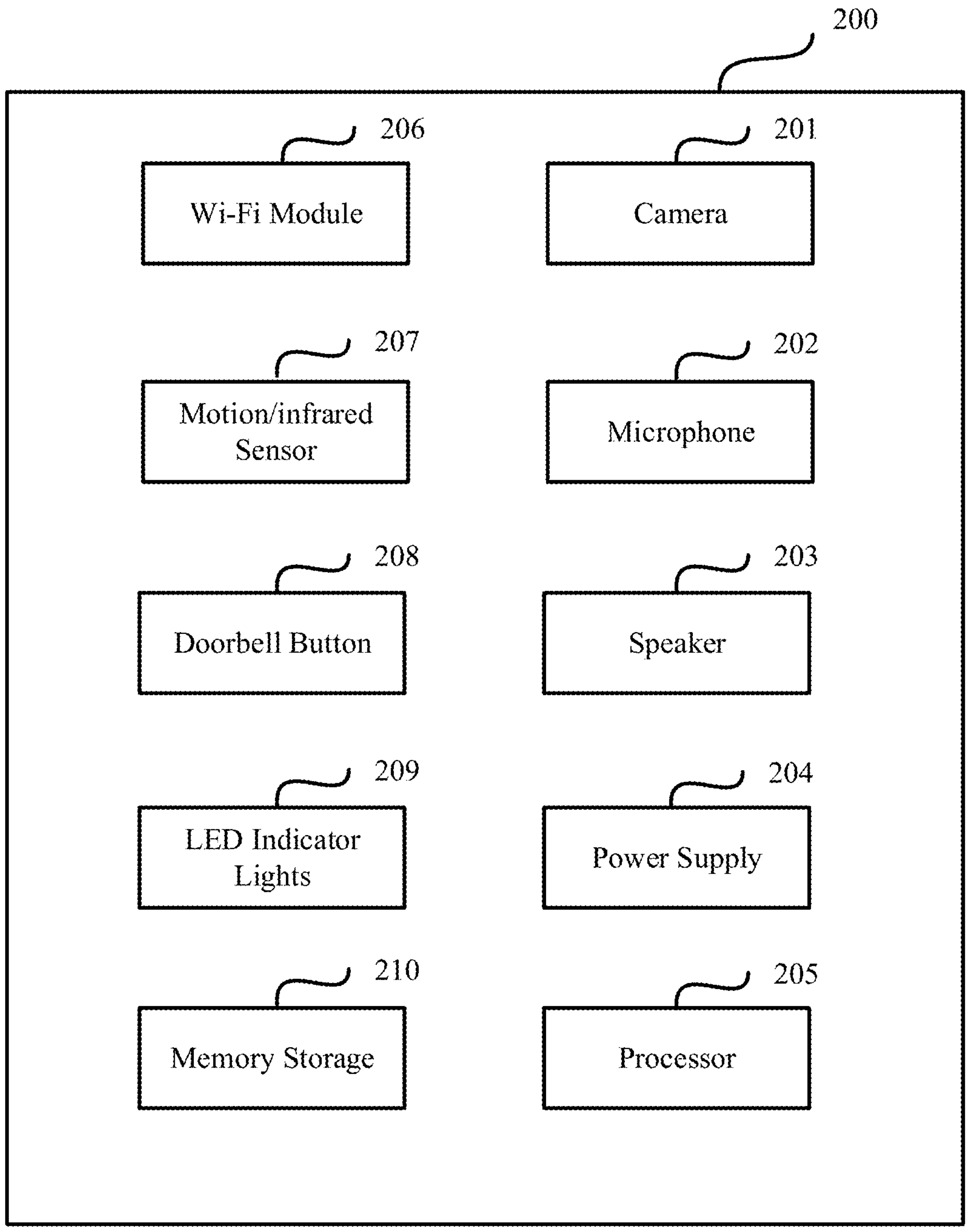
FIG. 2 shows an exemplary block diagram of a doorbell device according to at least one embodiment of the present disclosure.

FIG. 2 shows an exemplary block diagram of a doorbell device 200 according to at least one embodiment of the present disclosure. The doorbell device 200 may include a camera 201, a microphone 202, a speaker 203, a power supply 204, a processor 205, a Wireless Fidelity (Wi-Fi) module 206, a motion/infrared sensor 207, a doorbell button 208, light-emitting diode (LED) indicator lights 209, and a memory storage 210. The camera 201 may capture images of the environment in front of the door, and/or enable video recording and live streaming of visitors to the doorstep. The microphone 202 and the speaker 203 allow for two-way audio communication between the visitor and the homeowner. The power supply 204 may provide electrical power to the doorbell device, which may be wired to the home's existing doorbell system or powered by a battery. The processor 205 may manages the doorbell device's operations, including image/video capturing, image/video processing, audio communication, motion/object detection, alerting and so on. The processor 205 may also be called as a controller. The method 200 for capturing images by a camera of a doorbell device or other methods according to at least one embodiment of the present disclosure may be performed by the processor 205. The Wi-Fi module 206 may connect the doorbell device to the home's Wi-Fi network for remote access. The motion/infrared sensor 207 can detect movement or appearance around the doorbell, trigger alerts or recording. The doorbell button 208 may activate the doorbell device to send a notification to the homeowner's smart phone. The LED indicator lights 209 may indicate the status of the doorbell, such as when it's active, recording, or connected to Wi-Fi. The memory storage 210 may store recorded videos and images locally or via cloud services. The illustrated modules in the doorbell device are only for examples, but not for limitation. More or less modules are available in the doorbell device.

When a user installs the doorbell device on or beyond his/her home's door, the user may desire the doorbell device to monitor a certain circumstance near the door. In various scenes, the doorbell device may monitor a corridor if the doorbell device is facing the corridor, or the doorbell device may monitor a garden if the doorbell device is facing the garden, or else. Various scenes may have various light illumination conditions. The doorbell device may have to monitor various environments under various light conditions. Thus, the quality or effect of the image or video captured by the camera may be influenced by various light conditions and various environments. To be noted in the text, the examples are made with respect to the image captured by the camera, but it is known that a video is comprised of several images, and the examples made with respect to the image captured by the camera can also be applied to a video captured by the camera.

Figure 3:
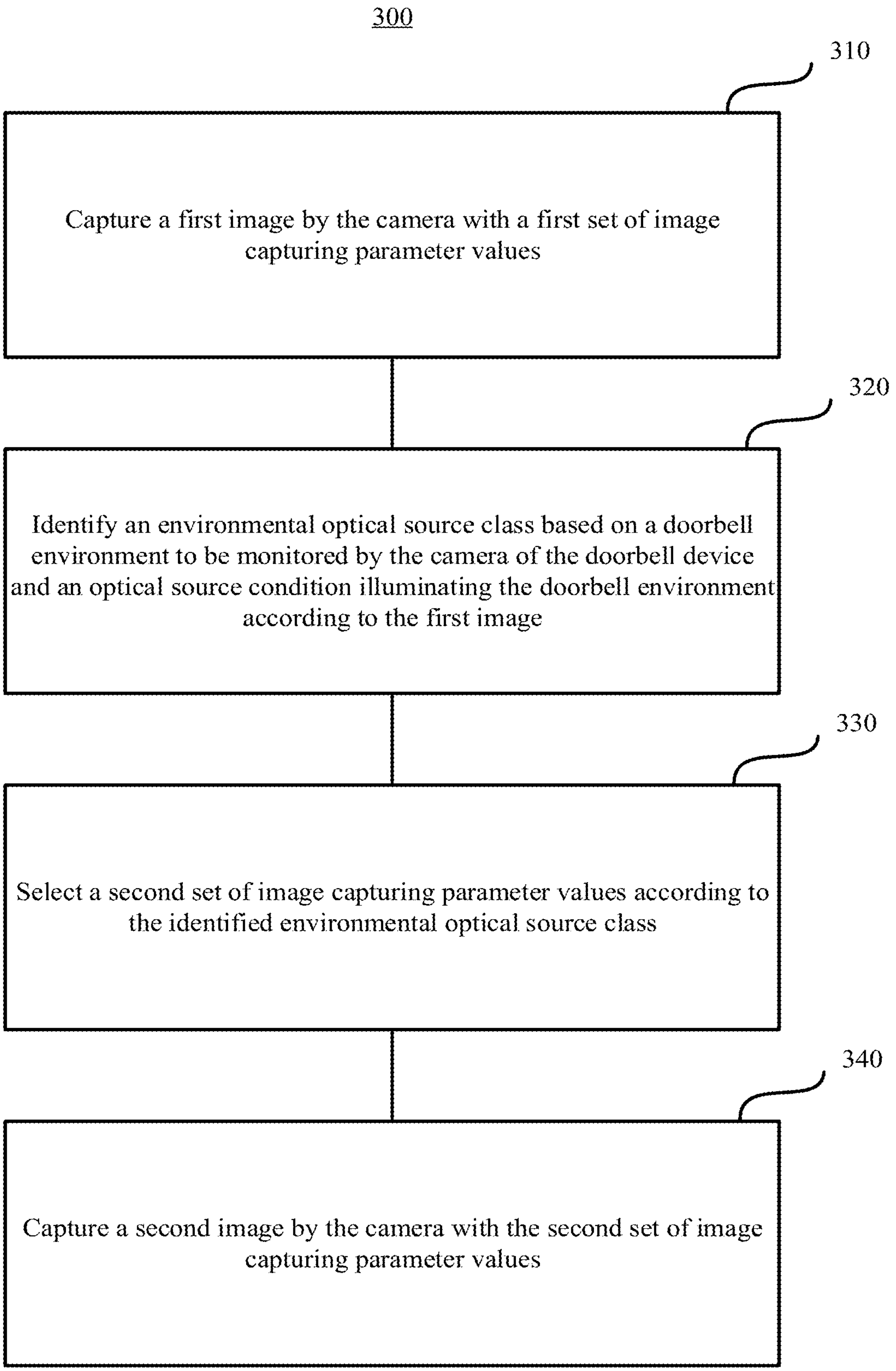
FIG. 3 shows an exemplary flow chart of a method for capturing images by a camera of a doorbell device according to at least one embodiment of the present disclosure.

FIG. 3 shows an exemplary flow chart of a method 300 for capturing images by a camera of a doorbell device according to at least one embodiment of the present disclosure.

The method 300 is performed by a doorbell device.

As shown in FIG. 3, the method 300 includes steps 310, 320, 330 and 340.

At step 310, a first image is captured by the camera with a first set of image capturing parameter values.

The first set of image capturing parameter values may be a set of default image capturing parameter values configured before the doorbell device is sold on the market. For example, a first set of image capturing parameter values may be pre-defined or pre-configured by manually or automatically optimizing the images captured by the camera of the doorbell device in a laboratory environment. Such first set of image capturing parameter values normally may not be applicable or optimized for various doorbell device usage scenes for various users' actual usages of the doorbell device due to light and environment differences between the laboratory environment and the various doorbell device usage scenes.

The set of image capturing parameter values may include values related to brightness correlation, such as exposure range, exposure adjustment step, tolerance, etc., and values related to color correlation, such as white balance matrix, color reduction matrix, color stylization matrix, etc., values related to definition/noise correlation, such as sharpening intensity, 2 dimensional (2D) noise reduction intensity, 3 dimensional (3D) noise reduction intensity, etc., values related to contrast correlation, such as gamma curve, wide dynamic curve, etc., which are performed when capturing images. The above mentioned set of image capturing parameter values are only for examples, but not for limitations, and other image capturing parameter values may be available.

When starting the camera for the first time or in other cases, the camera can capture a first image with a set of default image capturing parameter values. In particular, the camera may capture one first image $G_{ori}$ individually or from a live video recorded by the camera, and the camera (or the processor in the camera or in the doorbell device) may load a first set of image capturing parameter values $P_{ori}$, and capture a first image $G_{ori}$ by using the first set of image capturing parameter values $P_{ori}$. The camera may capture more than one first image. Further, the term of "capturing" may include using the image capturing parameter values to shot an image with a shutter of the camera.

But such captured first images may not have the optimal image effect under the certain circumstance in which the doorbell device is stalled.

At step 320, an environmental optical source class based on a doorbell environment to be monitored by the camera of the doorbell device and an optical source condition illuminating the doorbell environment may be identified according to the first image.

The environmental optical source class is designed by considering at least the doorbell environment to be monitored by the camera of the doorbell device and the optical source condition illuminating the doorbell environment. Once the specific environmental optical source class is identified, the specific usage of the doorbell device may be determined, so as to customize the set of image capturing parameter values of the camera optimized for such environmental optical source class, to obtain the optimal effect of the images captured by the camera for such environmental optical source class.

The doorbell environment to be monitored by the camera of the doorbell device means the target to be captured by the camera, and may include corridor, porch, garden/greenery, square, street where the doorbell device may face.

Different doorbell environments may present different needs for the image effects. For example, a corridor may be dark, and higher lightness may be needed on the captured image for the corridor. Or, the square may be too light, and lower lightness may be needed on the captured image for the square. Thus, considering the doorbell environment to be monitored by the camera of the doorbell device is useful for identifying the environmental optical source class, and for optimizing the effect of the images captured by the camera.

The optical source condition may include one or both of a type of an optical source illuminating the doorbell environment and an optical source coverage condition indicating how an optical source's light covers the doorbell environment.

The type of an optical source illuminating the doorbell environment may mean the illuminance condition of the optical source illuminating the doorbell environment, and may include natural light (sunrise, noon, or sunset), artificial light source (high color temperature, or low color temperature) and so on.

Different types of optical sources illuminating the doorbell environment may present different needs for the image effects. For example, a sunset light may be dark, and higher lightness may be needed on the captured image under the sunset light. Or, the noon may be too light, and lower lightness may be needed on the captured image under the noon light. Thus, considering the type of an optical source illuminating the doorbell environment is useful for identifying the environmental optical source class, and for optimizing the effect of the images captured by the camera.

The optical source coverage condition indicating how the optical source's light covers the doorbell environment indicates the condition of the light coverage of one or more optical sources. For example, the optical source coverage condition may include large area strong light, local strong light, diffuse reflection and so on.

Different types of optical source coverage conditions may present different needs for the image effects. For example, the local strong light condition may be dark in most area but be light in a little area, and higher lightness on the dart area and lower lightness on the little area may be needed on the captured image under the the local strong light condition. Or, the large area strong light condition may be too light, and lower lightness may be needed on the captured image under the large area strong light condition. Thus, considering the type of optical source coverage condition is useful for identifying the environmental optical source class, and for optimizing the effect of the images captured by the camera.

When considering the doorbell environment and the type of the optical source, the environmental optical source class may be identified as, for example, "corridor under artificial light source (high color temperature)", "square under natural light (noon)", "garden under artificial light source (low color temperature)" and so on.

When considering the doorbell environment and the optical source coverage condition, the environmental optical source class may be identified as, for example, "corridor in local area strong light condition", "square in large area strong light condition", "garden in diffusion reflection and so on".

When considering the doorbell environment, the type of the optical source and the optical source coverage condition, the environmental optical source class may be identified as, for example, "corridor under artificial light source (high color temperature) in local strong light condition", "square under natural light (noon) in the diffuse reflection condition", "garden under artificial light source (low color temperature) in the local strong light condition" and so on.

The step 320 of the doorbell environment to be monitored by the camera of the doorbell device and the optical source condition illuminating the doorbell environment according to the first image may include: determining the doorbell environment to be monitored by the camera of the doorbell device according to the first image; determining the type of an optical source illuminating the doorbell environment according to the first image; determining the optical source coverage condition indicating how the optical source's light covers the doorbell environment according to the first image; and identifying the environmental optical source class based on the determined doorbell environment, the determined type of an optical source and/or the determined optical source coverage condition.

When considering the doorbell environment, the type of an optical source and optical source coverage condition, the environmental optical source class may be identified as corridor under artificial light source (high color temperature) in local strong light condition, square under natural light (noon) in the diffuse reflection condition, garden under artificial light source (low color temperature) in the local strong light condition and so on.

There may be other factors to be considered when identifying an environmental optical source class, which may not be exemplified herein.

In at least one embodiment, the step 320 of identifying a doorbell environment to be monitored by the camera of the doorbell device and an optical source condition illuminating the doorbell environment according to the first image may include using an environmental optical source classification model to identify the environmental optical source class according to the first image.

Figure 4A:
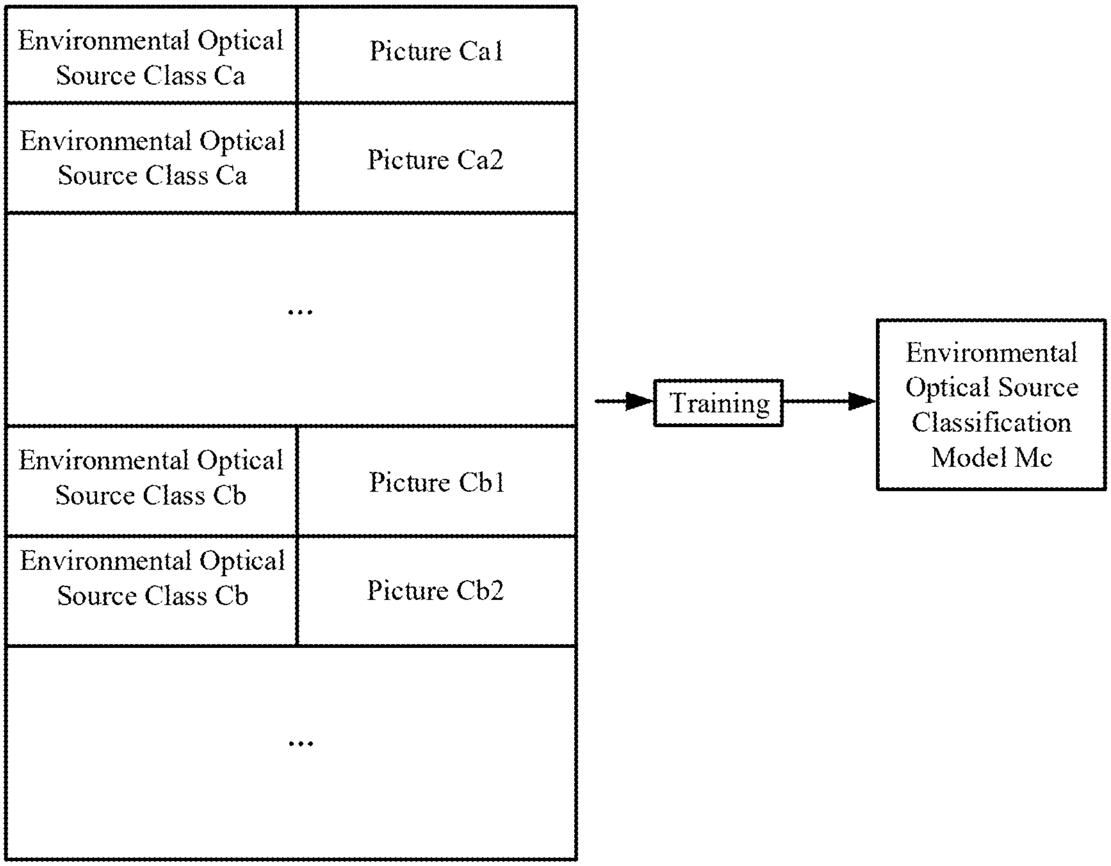
FIG. 4A shows a diagram illustrating the training of the environmental optical source classification model.

The environmental optical source classification model may be trained in advance or in real time. Such training may be performed only once. FIG. 4A shows a diagram illustrating the training of the environmental optical source classification model according to at least one embodiment of the present disclosure.

In particular, sample images under various environmental optical source classes may be obtained, and the sample images may be divided into a training set of sample images and a verification set of sample images.

Various sample environmental optical source class labels Ca, Cb, . . . may be labeled based on at least the sample doorbell environment to be monitored by the camera of the doorbell device and the sample type of an optical source illuminating the doorbell environment, as well as possibly the sample optical source coverage condition indicating how the optical source's light covers the doorbell environment for each sample image. The sample environmental optical source class labels may include "corridor under artificial light source (high color temperature) in local strong light condition", "square under natural light (noon) in the diffuse reflection condition", "garden under artificial light source (low color temperature) in the local strong light condition" and so on to indicate the sample doorbell environment and the sample type of an optical source, as well as possibly the sample optical source coverage condition in the sample images.

A classification algorithm may be performed on the training set of sample images or extracted features from the training set of sample images, to train the doorbell environment classification model or the optical source classification model.

For example, the training set of the sample images Ca1, Ca2, . . . and the corresponding environmental optical source class label Ca, the training set of the sample images Cb1, Cb2, . . . and the corresponding environmental optical source class label Cb, and so on may be subject to a deep learning classification algorithm to train the environmental optical source classification model Mc.

The trained environmental optical source classification model Mc may be verified by inputting the verification set of sample images to see if the output environmental optical source classes meet the environmental optical source class labels corresponding to the verification set of sample images. If not, then a further training may be performed. The deep leaning classification algorithm may include MobileNet, EfficientNet or else. And the deep leaning classification algorithm may be optimized based on model size, accuracy rate, recall rate, reasoning speed and other indicators.

In addition to the deep learning training algorithm, other algorithms, such as classification algorithm based on extracted features from the first image. The classification models involved in the deep learning training algorithm and the extracted feature-based classification algorithm may widely use technologies, such as convolutional neural network (based on deep learning algorithm) and K nearest neighbor algorithm (based on extracted feature-based classification algorithm).

Thus, an accurate environmental optical source classification model may be trained.

Figure 4B:
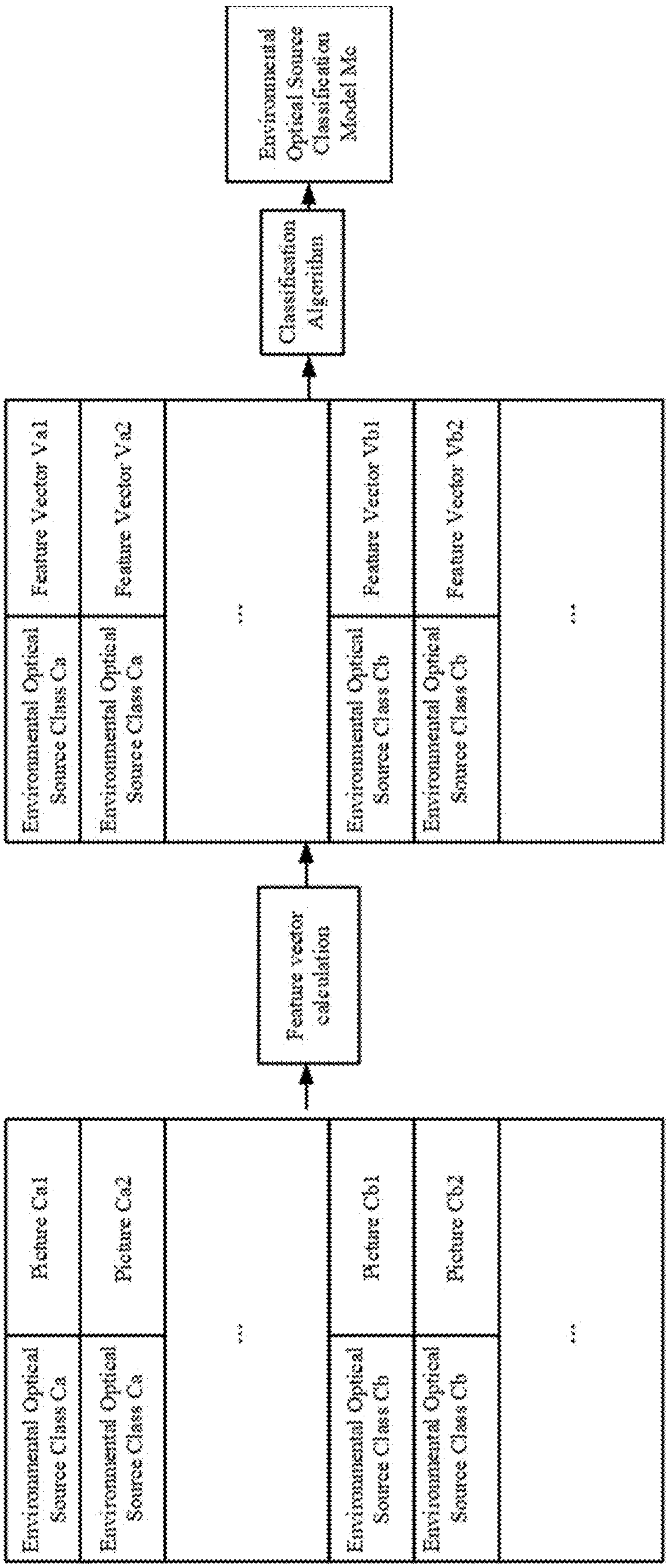
FIG. 4B shows a diagram illustrating the training of the doorbell environment classification model and the optical source classification model according to at least one embodiment of the present disclosure.

FIG. 4B shows a diagram illustrating the training of the doorbell environment classification model and the optical source classification model according to at least one embodiment of the present disclosure.

As show in FIG. 4B, feature vectors are calculated on the training set of the sample images Ca1, Ca2, . . . and the training set of the sample images Cb1, Cb2, . . . and so on. Thus, feature vectors Va1 are obtained for the training set of the sample images Ca1, . . . under the environmental optical source class Ca, feature vectors Va3 are obtained for the training set of the sample images Ca2, . . . under the environmental optical source class Ca. Feature vectors Vb1 are obtained for the training set of the sample images Cb1, under the environmental optical source class Cb, and feature vectors Vb2 are obtained for the training set of the sample images Cb2, under the environmental optical source class Cb. Other environmental optical source classes and related calculations are omitted herein.

The feature vectors may include any suitable image features, such as the statistical characteristics of estimated color temperature, brightness gradient amplitude and brightness gradient direction, significant color distribution, light and shade distribution, etc.

Then, the environmental optical source class labels Ca, Cb . . . and the corresponding feature vectors Va1, Va2, Vb1, Vb2, . . . may be subject to an extracted feature-based classification algorithm to train the environmental optical source classification model Mc. And a verification set of images can also be used to verify the trained environmental optical source classification model Mc.

With the obtained environmental optical source classification model, the first image obtained by using the first set of default image capturing parameter values (in deep learning algorithm) or the feature vectors calculated on the first image (in extracted feature-based classification algorithm) may be input into the environmental optical source classification model to obtain the identified environmental optical source class as an output.

In at least one embodiment, the doorbell environment to be monitored by the camera of the doorbell device may be identified individually according to the first images, and the optical source illuminating the doorbell environment may be identified individually according to the first images, and possibly, the optical source coverage condition indicating how the optical source's light covers the doorbell environment may be identified individually according to the first images. Then, the environmental optical source class may be identified based on the identified doorbell environment and the identified type of an optical source as well as possibly the identified optical source coverage condition.

In particular, the determining a doorbell environment to be monitored by the camera of the doorbell device according to the first image may be performed based on a doorbell environment classification model.

The determining a type of an optical source illuminating the doorbell environment according to the first image may be performed based on an optical source classification model.

Figure 4C:
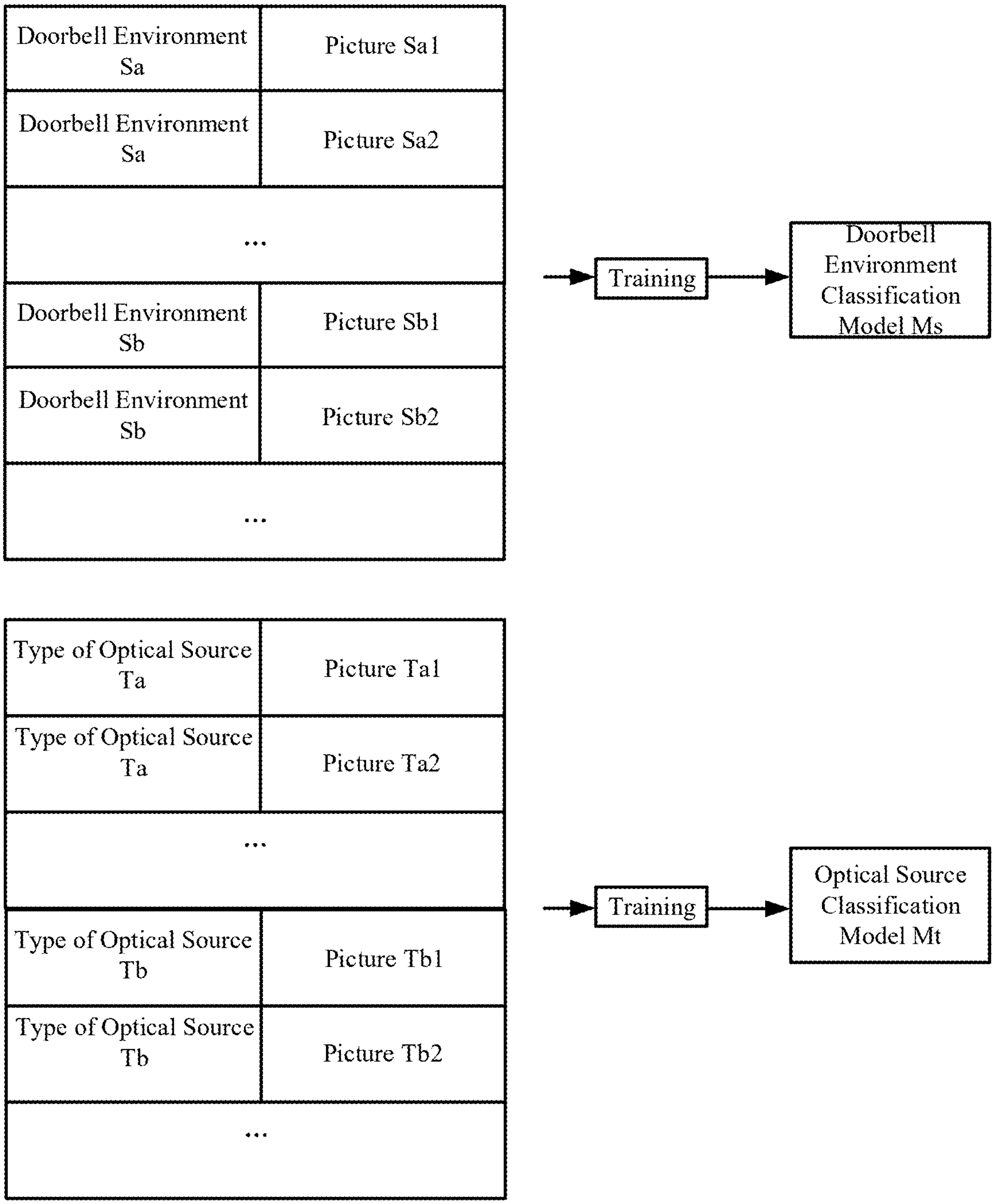
FIG. 4C shows a diagram illustrating the training of the doorbell environment classification model and the optical source classification model according to at least one embodiment of the present disclosure.

FIG. 4C shows a diagram illustrating the training of the doorbell environment classification model and the optical source classification model according to at least one embodiment of the present disclosure.

In particular, sample images under various doorbell environments/types of optical sources may be obtained, and the sample images may be divided into a training set of sample images and a verification set of sample images.

Various doorbell environment labels Sa, Sb, . . . may be labeled based on the sample doorbell environment to be monitored by the camera of the doorbell device. The doorbell environment labels may include "corridor", "square", "garden" and so on to indicate the sample doorbell environment.

The training set of the sample images Sa1, Sa2, . . . and the corresponding doorbell environment label Sa, the training set of the sample images Sb1, Sb2, . . . and the corresponding doorbell environment label Sb, and so on may be subject to a deep leaning classification algorithm to train the environmental optical source classification model Ms. The trained doorbell environment classification model Mc may be verified by inputting the verification set of sample images to see if the output doorbell environments meet the doorbell environment labels corresponding to the verification set of sample images. If not, then a further training may be performed.

Various type of an optical source labels Ta, Tb, . . . may be labeled based on the sample type of an optical source illuminating the doorbell environment. The optical source labels may include "artificial light source (high color temperature)", "natural light (noon)", "artificial light source (low color temperature)" and so on to indicate the sample type of an optical source.

A classification algorithm may be performed on the training set of sample images or extracted features from the training set of sample images, to train the doorbell environment classification model/the optical classification model.

For example, the training set of the sample images Ta1, Ta2, . . . and the corresponding optical source label Ta, the training set of the sample images Tb1, Tb2, . . . and the corresponding optical source label Tb, and so on may be subject to a deep leaning classification algorithm to train the environmental optical source classification model Mt. The trained optical source classification model Mc may be verified by inputting the verification set of sample images to see if the output optical sources meet the optical source labels corresponding to the verification set of sample images. If not, then a further training may be performed.

The above mentioned classification models may also involve the deep learning training algorithm and classification algorithm based on extracted features, and may widely use technologies, such as convolutional neural network (based on deep learning algorithm) and K nearest neighbor algorithm (based on extracted feature algorithm).

Thus, a more accurate doorbell environment classification model and a more accurate the optical source classification model may be trained.

In at least one embodiment, the doorbell environment classification model is updatable by receiving a user indicated doorbell environment with respect to the first image, the optical source classification model is updatable by receiving a user indicated optical source type label with respect to the first image, and the environmental optical source classification is updatable by receiving a user indicated environmental optical source class with respect to the first image. Thus, in a case that when the doorbell device is actually used at a user's house, the user may input or send the user feedback for indicating the sample doorbell environment/optical source type/environmental optical source class to the doorbell device or to a cloud service or a remote device, so as to further train the corresponding model by using many user feedbacks collected from many users or by manually adjusting the corresponding model and improve the accuracy of the corresponding model. In addition, some features, and some objective evaluation indicators, such as brightness, color, clarity of the captured image may also be sent to a cloud service or a remote device to facilitate the update or adjustment of the models. The updated models in the cloud service or a remote device may be sent back to the doorbell device. In this way, the models may be updated and better with time.

Figure 5:
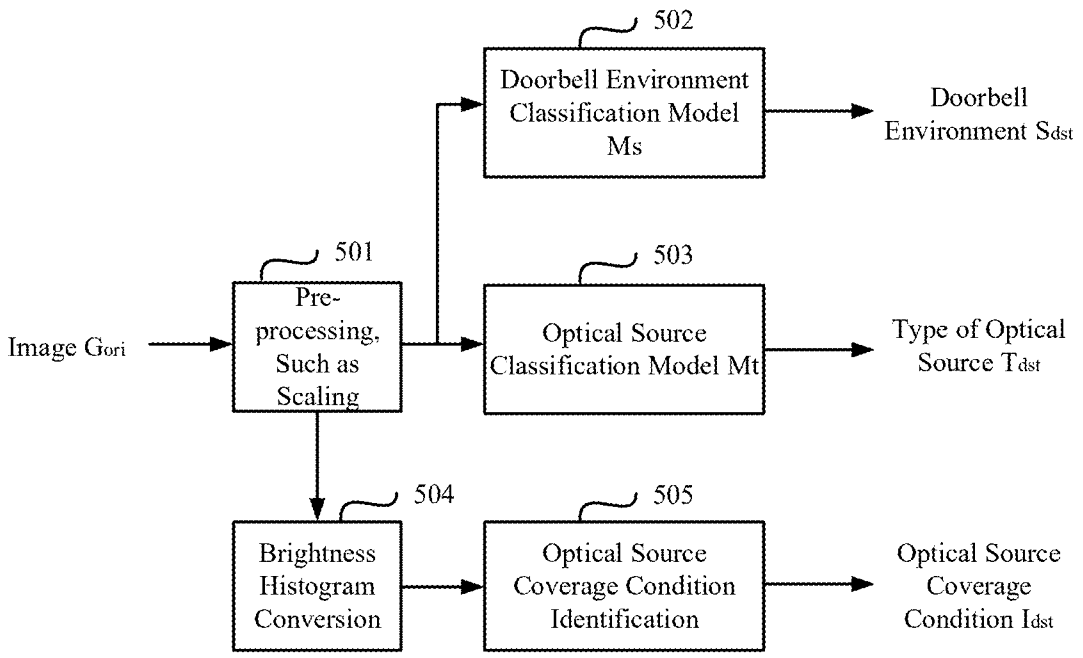
FIG. 5 shows an exemplified flowchart of identifying a doorbell environment, a type of optical source and an optical source coverage condition according to at least one embodiment of the present disclosure.

FIG. 5 shows an exemplified flowchart of identifying doorbell environment $S_{dst}$, type of optical source $T_{dst}$ and optical source coverage condition $I_{dst}$ according to at least one embodiment of the present disclosure.

With the doorbell environment classification model Ms and the optical source classification model Mt, a first image $G_{ori}$ captured by using the first set of default image capturing parameter values, after some pre-processing 501 (which is optional), such as scaling, may be input into the doorbell environment classification model Ms 502 and the optical source classification model Mt 503 to obtain the identified doorbell environment $S_{dst}$ and the identified type of an optical source $T_{dst}$ as outputs.

In at least one embodiment, the determining an optical source coverage condition indicating how the optical source's light covers the doorbell environment may include determining the optical source coverage condition based on a brightness histogram of the first image.

In at least one embodiment, in 504, the determining the optical source coverage condition based on a brightness histogram of the first image includes: converting the first image into a gray-scale image; calculating a brightness histogram of the gray-scale image; determining a proportion of pixels with a pixel value larger than a value threshold based on the brightness histogram; determining a highlight area including the pixels with a pixel value larger than the value threshold, if the proportion is larger than a percentage threshold; determining an area percentage of the highlight area to the gray-scale image and a position of the highlight area; and determining the optical source coverage condition based on the area percentage of the highlight area and/or the position of the highlight area.

For example, the first image $G_{ori}$, optionally after some pre-processing 501, such as scaling, may be converted into a gray-scale image $G_{gray}$, and a brightness histogram $H_{ist}$ of the gray-scale image $G_{gray}$ is calculated. Through the brightness histogram $H_{ist}$, a proportion of pixels with the pixel value>300 (the value threshold of "300" may be adjusted) may be determined. In 505, if the proportion is less than 10% (the percentage threshold of "10%" can also be adjusted), the optical source coverage condition $I_{dst}$ may be identified as diffuse reflection condition. If the proportion is greater than 10%, a highlight area including the pixels with the pixel values>300 may be determined, and the highlight area including only the pixels with pixel values>300 are reserved in the gray-scale image while removing other areas from the gray-scale image. After binarizing the gray-scale image, a connected region of the highlight area is calculated, the gray-scale image is divided into 3×3 regions (or other numbers of regions), and an area percentage of Intersection over Union (IoU) for the connected region with each region is calculated. If the IoU is greater than 20% (or other threshold), it may be identified as the light coverage area. If there are two or more light coverage areas (that is, the number of the coverage areas is larger than a number threshold), the optical source coverage condition may be identified as large area strong light condition, otherwise the optical source coverage condition may be identified as local strong light condition.

To be noted that the above example is only for exemplification, but not for limitation, many methods for determining the optical source coverage condition based on a brightness histogram of the first image may be conceived.

Thus, the environmental optical source class $C_{dst}$ may be identified based on the identified doorbell environment $S_{dst}$, the identified type of an optical source $T_{dst}$ and the identified optical source coverage condition $I_{dst}$. Since the environmental optical source class includes one or more aspects of the identified doorbell environment, the identified type of an optical source and the identified optical source coverage condition, the identified environmental optical source class may be more accurate to describe the actual usage situation of the user's doorbell device.

Back to FIG. 3, at step 330, a second set of image capturing parameter values may be selected according to the identified environmental optical source class.

In particular, the second set of image capturing parameter values may be selected from a plurality of sets of image capturing parameter values designed for various environmental optical source classes, respectively, to obtain optimal image effects under the various environmental optical source classes. And selecting which one set of image capturing parameter values from the plurality of sets of image capturing parameter values may be performed based on a correspondence relationship.

In at least one embodiment, in the step 330, the second set of image capturing parameter values may be selected according to the identified environmental optical source class based on a correspondence relationship between the second set of image capturing parameter values and the environmental optical source class.

The correspondence relationship indicates that such second set of image capturing parameter values is considered as the best parameter values for capturing the images by the camera under the identified environmental optical source class, and possibly better parameter values for capturing the images by the camera under the identified environmental optical source class than under any other environmental optical source classes.

In at least one embodiment, in determining the correspondence relationship, a plurality of first test images may be captured by a test camera under a first environmental optical source class with a plurality of first candidate sets of image capturing parameter values. A first quality score is calculated for each of the plurality of first test images. A target test image with a highest first quality score of the first quality scores may be determined. The correspondence relationship between a first target set of image capturing parameter values for capturing the target test image and the first environmental optical source class may be determined.

Thus, each correspondence relationship between a candidate set of image capturing parameter values and a corresponding environmental optical source class may be obtained. There is a correspondence relationship between the second set of image capturing parameter values and the first environmental optical source class as mentioned above. That is, the first target set of image capturing parameter values may be the second set of image capturing parameter values, and the first environmental optical source class may be the identified environmental optical source class.

The test camera may be a specific camera in a laboratory environment, or the camera of the doorbell device itself so that the determined correspondence relationship is more accurate for that camera.

In at least one embodiment, the calculating the first quality score for each of the plurality of first test images may include: calculating a set of values of quality evaluation indicators for each of the plurality of first test images; determining a first set of weights for the first environmental optical source class with respect to the set of the values of the quality evaluation indicators; and calculating a weighted sum for the set of the values of the quality evaluation indicators as the first quality score.

The first quality score may be used to evaluate the degree of the optimal image effect. The first quality score may be made by considering quality evaluation indicators of the first test image. The quality evaluation indicators of the first test image may include objective evaluation indicators and subjective evaluation indicators. The objective evaluation indicators may include common indicators in the industry, such as color deviation $\Delta C$ and $\Delta E$, color saturation, signal-to-noise ratio (SNR), gray scale number, brightness uniformity, color uniformity, resolutions of the center and edge of the sample image after video coding, etc. The subjective evaluation indicators include effect indicators of static/dynamic sample images evaluated subjectively.

Each quality evaluation indicator may be assigned with a corresponding weight, so that a total first quality score of a weighted sum may be calculated by using the values of the evaluation indicators and corresponding weights. In order to know which candidate set of image capturing parameter values is the best under a specific environmental optical source class, several candidate sets of image capturing parameter values may be applied on the images captured by the test camera, to see which first test image applied with a candidate set of image capturing parameter values is best, and the evaluation standard for the best image may be indicated by the calculated total score. The highest the total first quality score is, the best the image effect is, and a correspondence relationship should be determined between the candidate set of image capturing parameter values (which make the first test image produce the highest total first quality score) and the specific environmental optical source class.

To be noted that for a second environmental optical source class which is different from the first environmental optical source class, a plurality of second test images may be captured by a test camera under the second environmental optical source class with a plurality of second candidate sets of image capturing parameter values. A second quality score is calculated for each of the plurality of second test images. A second target test image with a highest second quality score of the second quality scores may be determined. The correspondence relationship between a second target set of image capturing parameter values for capturing the second target test image and the second environmental optical source class may be determined.

For other environmental optical source classes, the same steps may be performed to determine correspondence relationship between a particular set of image capturing parameter values and a particular environmental optical source class.

Thus, a more accurate correspondence relationship between a particular set of image capturing parameter values and a particular environmental optical source class may be obtained so as to more accurately select the particular set of image capturing parameter values optimal for the particular environmental optical source class.

To be noted that the terms of "first" and "second" herein indicate any one, but does not specify a sequence or a particular one.

Thus, with the embodiments of the disclosure, the correspondence relationship between the set of image capturing parameter values and the environmental optical source class may be determined.

When calculating the quality score, different weights may provide different emphasises on the corresponding evaluation indicators.

For different environmental optical source classes, at least one weight of the weights for the corresponding evaluation indicators may be different, that is, the first set of weights for the first environmental optical source class may be different from a second set of weights for a second environmental optical source class. For example, when the environmental optical source class is "garden under artificial light source (low color temperature) in the local strong light condition", and the garden and the green plants are to be captured, the evaluation indicators about saturation and clarity may be more focused on than under other environmental optical source classes, so the weights for a saturation evaluation indicator and a clarity evaluation indicator under the environmental optical source class may be higher than the weights under other environmental optical source classes. When the environmental optical source class is "street under natural light (noon) in the diffuse reflection condition", the evaluation indicators about human figures, the clarity of vehicles, the smear and noise of dynamic objects in low illumination, etc., may be more focused on than under other environmental optical source classes, so the weights for evaluation indicators about human figures, the clarity of vehicles, the smear and noise of dynamic objects in low illumination under the environmental optical source class may be higher than the weights under other environmental optical source classes.

In another embodiment, for different doorbell environments, at least one weight of the weights for the corresponding evaluation indicators may be different, that is, the first set of weights for a first doorbell environment may be different from a second set of weights for a second doorbell environment. For example, when the doorbell environment is "garden", and the garden and the green plants are to be captured, the evaluation indicators about saturation and clarity may be more focused on than under other doorbell environments, so the weights for a saturation evaluation indicator and a clarity evaluation indicator under the doorbell environment of garden may be higher than the weights under other doorbell environments. When the doorbell environment is "street", the evaluation indicators about human faces, the clarity of vehicles, the smear and noise of dynamic objects in low illumination, etc., may be more focused on than under other doorbell environments, so the weights for evaluation indicators about human faces, the clarity of vehicles, the smear and noise of dynamic objects in low illumination under the doorbell environment of street may be higher than the weights under other doorbell environments.

In another embodiment, for different functions of the doorbell device, at least one weight of the weights for the corresponding evaluation indicators may be different, that is, the first set of weights for a first function of the doorbell device may be different from a second set of weights for a second function of the doorbell device. For example, for a function of face recognition, evaluation indicators about the clarity of human face in different scenes/light sources, and the clarity and noise quality of human face after coding may be more focused on than under other functions of the doorbell device. For a function of package detection, evaluation indicators about the color reproduction quality, brightness, clarity and other indicators of the package area may be more focused on than under other functions of the doorbell device.

Thus, the accuracy of the calculated quality score may be improved by distinguishing different scenes.

The above calculation of quality scores and/or the determination of the correspondence relationship may be performed before the doorbell device is sold on the market, and the correspondence relationship as well as the first (default) sets of the image capturing parameters and sets of the image capturing parameters to be selected may be stored in advance in the doorbell device, so that once the doorbell device is initially started or in other cases, the method 300 may be performed. In other embodiments, the correspondence relationship as well as the first (default) sets of the image capturing parameters and sets of the image capturing parameters to be selected may be downloaded or obtained from a cloud service server or a remote device in advance or when such data are needed.

Thus, with the embodiments of the disclosure, the quality scores may be more accurately calculated under various environmental optical source classes/doorbell environments/functions of the doorbell device, and a more accurate correspondence relationship may be determined, so that more accurate set of image capturing parameter values may be selected to perform a more accurate capturing of the one or more images by the camera with the set of image capturing parameter values under the sample environmental optical source class, and a more accurate effect may be realized for the function of the doorbell device based on the captured images.

At step 340, a second image may be captured by the camera with the second set of image capturing parameter values.

For example, if the selected second set of image capturing parameter values include a certain Gamma curve value, and a certain sharpening strength value and so on, such Gamma curve value, sharpening strength value and so on may be applied when capturing the second image. Other examples may be constructed, and are not described herein for simplification.

Thus, with the embodiments of the disclosure, the second set of image capturing parameter values may be selected according to the identified environmental optical source class for the camera of the doorbell device to actually monitor, so that a suitable set of image capturing parameter values may be selected to perform a suitable capturing of the one or more images by the camera with the suitable set of image capturing parameter values under the sample environmental optical source class, and a more accurate effect may be realized for the function of the doorbell device based on the captured images, such as more accurate face recognition/package detection, clearer and more comfortable images/videos displayed for the user to enjoy.

In at least one embodiment, in response to a predetermined period being reached, the second set of image capturing parameter values may be reset as the first set of image capturing parameter values; and steps 310-340 of the capturing a first image, the identifying, the selecting, and the capturing a second image may be repeated. Thus, if the sample environmental optical source class is recently changed, the suitable set of image capturing parameter values may be re-selected and applied in time.

Further, the embodiments of the disclosure can improve the image effect without changing the installation position of the user doorbell device. In this disclosure, only the digital image processing algorithm is used to analyse the images to automatically find the best or better set of image capturing parameters, and there is no need to manually modify the image capturing parameters for capturing the images. The pre-work, such as model training, the correspondence relationship determination and so on, does not need to be repeated on different doorbell devices. The identification, selection and image capturing may be performed off-line at the doorbell device end without connecting to the Internet, thus protecting the privacy of users.

Figure 6:
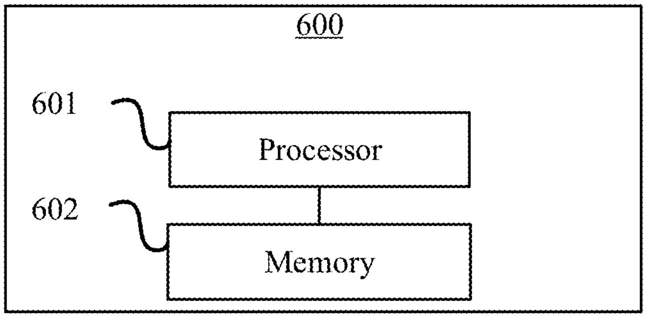
FIG. 6 is an exemplary block diagram illustrating a doorbell device for capturing images by a camera of the doorbell device according to at least one embodiment of the present disclosure.

FIG. 6 is an exemplary block diagram illustrating a doorbell device 600 for capturing images by a camera of the doorbell device according to at least one embodiment of the present disclosure.

As shown in FIG. 6, the doorbell device 600 may include one or more processors 601 and a memory 602. The one or more processors 601 are communicatively coupled with the memory 602 and configured to perform the methods for capturing images by a camera of the doorbell device as discussed above.

Examples of the one or more processors 601 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The one or more processors 601 can execute software. Software shall be construed broadly to mean instructions, instruction sets, code, code segments, program code, programs, subprograms, software models, applications, software applications, software packages, routines, subroutines, objects, executables, threads of execution, procedures, functions, etc., whether referred to as software, firmware, middleware, microcode, hardware description language, or otherwise. The software may reside on memory 602.

The memory 602 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 602 may reside in the one or more processors 601, external to the one or more processors 601, or distributed across multiple entities including the one or more processors 601. The memory 602 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

In addition, according to another embodiment of the present disclosure, a computer program product is disclosed. As an example, the computer program product comprises a non-transitory computer readable storage medium having program instructions embodied therewith, and the program instructions are executable by a processor of a doorbell device. When executed, the program instructions cause the processor to perform one or more of the described procedures above, and details are omitted herein for conciseness.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions may be used in the disclosure as a convenient method for distinguishing two or more units. Thus, a reference to a first unit and a second unit does not imply that only two units may be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions may be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units may be physical or logical, or can also be a combination of the two. As used in the disclosure, two units may be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for capturing images by a camera of a doorbell device, the method comprising:

capturing a first image by the camera with a first set of image capturing parameter values;

identifying an environmental optical source class based on a doorbell environment to be monitored by the camera of the doorbell device and an optical source condition illuminating the doorbell environment according to the first image;

selecting a second set of image capturing parameter values according to the identified environmental optical source class; and capturing a second image by the camera with the second set of image capturing parameter values, wherein the selecting the set of image capturing parameter values according to the identified environmental optical source class comprises:

selecting the second set of image capturing parameter values based on a correspondence relationship between the second set of image capturing parameter values and the identified environmental optical source class, wherein the correspondence relationship is determined by:

capturing a plurality of first test images by a test camera under a first environmental optical source class with a plurality of first candidate sets of image capturing parameter values;

calculating a first quality score for each of the plurality of first test images;

determining a target test image with a highest first quality score of the first quality scores; and determining the correspondence relationship between a first target set of image capturing parameter values for capturing the target test image and the first environmental optical source class, wherein the first target set of image capturing parameter values is the second set of image capturing parameter values, and the first environmental optical source class is the identified environmental optical source class.

2. The method of claim 1, wherein the optical source condition includes one or both of a type of an optical source illuminating the doorbell environment and an optical source coverage condition indicating how an optical source's light covers the doorbell environment, wherein the identifying an environmental optical source class based on the doorbell environment to be monitored by the camera of the doorbell device and the optical source condition illuminating the doorbell environment according to the first image comprises:

determining the doorbell environment to be monitored by the camera of the doorbell device according to the first image;

determining the type of the optical source illuminating the doorbell environment according to the first image; and/or determining the optical source coverage condition indicating how the optical source's light covers the doorbell environment according to the first image; and identifying the environmental optical source class based on the determined doorbell environment, the determined type of an optical source and/or the determined optical source coverage condition.

3. The method of claim 1, wherein the calculating the first quality score for each of the plurality of first test images comprises: calculating a set of values of quality evaluation indicators for each of the plurality of first test images; determining a first set of weights for the first environmental optical source class with respect to the set of the values of the quality evaluation indicators; and calculating a weighted sum for the set of the values of the quality evaluation indicators as the first quality score.

4. The method of claim 3, wherein, the first set of weights for the first environmental optical source class is different from a second set of weights for a second environmental optical source class, or the first set of weights for a first doorbell environment is different from a second set of weights for a second doorbell environment, or the first set of weights for a first function of the doorbell device is different from a second set of weights for a second function of the doorbell device.

5. The method of claim 2, wherein, the determining the doorbell environment to be monitored by the camera of the doorbell device according to the first image includes determining the doorbell environment based on a doorbell environment classification model by inputting the first image or extracted features from the first image;

the determining the type of the optical source illuminating the doorbell environment according to the first image includes determining the type of the optical source based on an optical source classification model by inputting the first image or extracted features from the first image; and/or the determining the optical source coverage condition indicating how the optical source's light covers the doorbell environment according to the first image includes determining the optical source coverage condition based on a brightness histogram of the first image.

6. The method of claim 5, wherein the determining the optical source coverage condition based on the brightness histogram of the first image comprises:

converting the first image into a gray-scale image;

calculating a brightness histogram of the gray-scale image;

determining a proportion of pixels with a pixel value larger than a value threshold based on the brightness histogram;

determining a highlight area including the pixels with a pixel value larger than the value threshold, if the proportion is larger than a percentage threshold;

determining an area percentage of the highlight area to the gray-scale image and a position of the highlight area; and determining the optical source coverage condition based on the area percentage of the highlight area and/or the position of the highlight area.

7. The method of claim 5, wherein the doorbell environment classification model or the optical source classification model is trained by:

obtaining sample images;

dividing the sample images divided into a training set of sample images and a verification set of sample images;

performing a classification algorithm on the training set of sample images or extracted features from the training set of sample images, to train the doorbell environment classification model or the optical source classification model; and verifying the trained doorbell environment classification model or the optical source classification model by inputting the verification set of sample images.

8. The method of claim 5, wherein the doorbell environment classification model is updatable by receiving a user indicated doorbell environment with respect to the first image, and the optical source classification model is updatable by receiving a user indicated optical source type label with respect to the first image.

9. The method of claim 1, wherein the identifying the environmental optical source class based on the doorbell environment to be monitored by the camera of the doorbell device and the optical source condition illuminating the doorbell environment according to the first image includes identifying the environmental optical source class based on an environmental optical source classification model by inputting the first image or extracted features from the first image.

10. The method of claim 9, wherein the environmental optical source classification model is trained by:

obtaining sample images;

dividing the sample images divided into a training set of sample images and a verification set of sample images;

performing a classification algorithm on the training set of sample images or extracted features from the training set of sample images, to train the environmental optical source classification model; and verifying the trained the environmental optical source classification model by inputting the verification set of sample images.

11. The method of claim 1, further comprising:

in response to a predetermined period being reached, resetting the second set of image capturing parameter values as the first set of image capturing parameter values; and repeating steps of the capturing a first image, the identifying, the selecting, and the capturing a second image.

12. A doorbell device for capturing images by a camera of the doorbell device, comprising:

one or more processors; and a memory coupled to at least one of the processors;

wherein, a set of computer program instructions stored in the memory, which, when executed by at least one of the processors, perform actions of:

capturing a first image by the camera with a first set of image capturing parameter values;

identifying an environmental optical source class based on a doorbell environment to be monitored by the camera of the doorbell device and an optical source condition illuminating the doorbell environment according to the first image;

selecting a second set of image capturing parameter values according to the identified environmental optical source class; and capturing a second image by the camera with the second set of image capturing parameter values, wherein the selecting the set of image capturing parameter values according to the identified environmental optical source class comprises:

selecting the second set of image capturing parameter values based on a correspondence relationship between the second set of image capturing parameter values and the identified environmental optical source class, wherein the correspondence relationship is determined by:

capturing a plurality of first test images by a test camera under a first environmental optical source class with a plurality of first candidate sets of image capturing parameter values;

calculating a first quality score for each of the plurality of first test images;

determining a target test image with a highest first quality score of the first quality scores; and determining the correspondence relationship between a first target set of image capturing parameter values for capturing the target test image and the first environmental optical source class, wherein the first target set of image capturing parameter values is the second set of image capturing parameter values, and the first environmental optical source class is the identified environmental optical source class.

13. The doorbell device of claim 12, wherein the optical source condition includes one or both of a type of an optical source illuminating the doorbell environment and an optical source coverage condition indicating how an optical source's light covers the doorbell environment, wherein the identifying an environmental optical source class based on the doorbell environment to be monitored by the camera of the doorbell device and the optical source condition illuminating the doorbell environment according to the first image comprises:

determining the doorbell environment to be monitored by the camera of the doorbell device according to the first image;

determining the type of the optical source illuminating the doorbell environment according to the first image; and/or determining the optical source coverage condition indicating how the optical source's light covers the doorbell environment according to the first image; and identifying the environmental optical source class based on the determined doorbell environment, the determined type of an optical source and/or the determined optical source coverage condition.

14. The doorbell device of claim 13, wherein, the determining the doorbell environment to be monitored by the camera of the doorbell device according to the first image includes determining the doorbell environment based on a doorbell environment classification model by inputting the first image or extracted features from the first image;

the determining the type of the optical source illuminating the doorbell environment according to the first image includes determining the type of the optical source based on an optical source classification model by inputting the first image or extracted features from the first image; and/or the determining the optical source coverage condition indicating how the optical source's light covers the doorbell environment according to the first image includes determining the optical source coverage condition based on a brightness histogram of the first image.

15. The doorbell device of claim 14, wherein the determining the optical source coverage condition based on a brightness histogram of the first image comprises:

converting the first image into a gray-scale image;

calculating a brightness histogram of the gray-scale image;

determining a proportion of pixels with a pixel value larger than a value threshold based on the brightness histogram;

determining a highlight area including the pixels with a pixel value larger than the value threshold, if the proportion is larger than a percentage threshold;

determining an area percentage of the highlight area to the gray-scale image and a position of the highlight area; and determining the optical source coverage condition based on the area percentage of the highlight area and/or the position of the highlight area.

16. The doorbell device of claim 14, wherein the doorbell environment classification model is updatable by receiving a user indicated doorbell environment with respect to the first image, and the optical source classification model is updatable by receiving a user indicated optical source type label with respect to the first image.

17. The doorbell device of claim 12, wherein the set of computer program instructions stored in the memory, which, when executed by at least one of the processors, further perform actions of:

in response to a predetermined period being reached, resetting the second set of image capturing parameter values as the first set of image capturing parameter values; and repeating steps of the capturing a first image, the identifying, the selecting, and the capturing a second image.

* * * * *